United States Patent [19]
Kephart et al.

[11] Patent Number: 6,016,546
[45] Date of Patent: Jan. 18, 2000

[54] EFFICIENT DETECTION OF COMPUTER VIRUSES AND OTHER DATA TRAITS

[75] Inventors: Jeffrey Owen Kephart, Cortlandt Manor, N.Y.; Alexandre Guy Georges Morin, Thonon-les-Bains, France; Gregory Bret Sorkin, New York, N.Y.; Joseph Warreb Wells, Newbury Park, Calif.

[73] Assignee: International Business Machines Corporation, Armonk, N.Y.

[21] Appl. No.: 08/890,013

[22] Filed: Jul. 10, 1997

[51] Int. Cl.⁷ ........................................... G06F 13/00
[52] U.S. Cl. ................................................ 713/200
[58] Field of Search .............................. 395/186, 187.01, 395/183.14, 182.04; 364/918.7; 380/4; 714/6, 38; 713/201, 200

[56] References Cited

U.S. PATENT DOCUMENTS

| | | | |
|---|---|---|---|
| 5,452,442 | 9/1995 | Kephart | 395/183.14 |
| 5,675,711 | 10/1997 | Kephart et al. | 395/22 |
| 5,765,030 | 7/1996 | Nachenberg et al. | 395/183.09 |
| 5,822,517 | 4/1996 | Dotan | 395/186 |
| 5,832,208 | 9/1996 | Chen et al. | 395/187.01 |
| 5,854,916 | 11/1996 | Nachenberg | 395/500 |

FOREIGN PATENT DOCUMENTS

| | | | |
|---|---|---|---|
| 2840292 | 8/1993 | Austria | G06F 15/20 |
| 0380240 | 8/1990 | European Pat. Off. | G06F 15/401 |
| 9712322 | 4/1997 | European Pat. Off. | G06F 11/00 |
| 2694984 | 2/1994 | France | G06F 15/40 |
| 9101181 | 2/1993 | Netherlands | G06F 11/00 |
| 9632686 | 10/1996 | WIPO | G06F 17/30 |

OTHER PUBLICATIONS

Communications Components, GaAs & Silicon Products Designer's Catalog, RF Components for RF/ID and RF Tags, Hewlett–Packard Co. 5091–4574E, pp. 2–16 to 2–17, Jan. 1993.

*Primary Examiner*—Joseph E. Palys
*Assistant Examiner*—Omar Omar
*Attorney, Agent, or Firm*—David M. Shofi

[57] ABSTRACT

The present invention provides a method of reducing the amount of memory required to scan a given data string for the presence of computer viruses or other data traits of interest including the steps of 1) loading into a memory of a computer a set of generic features that are functionally similar to standard computer virus signatures, but tend to be less specific to particular viruses, 2) locating occurrences of the generic features within the data string, 3) applying a first mapping from the occurrences located during step 2) to obtain a subset of standard signatures, 4) loading the subset of standard signatures into a memory of said computer, 5) locating occurrences within the data string of all signatures from the subset of standard signatures, and 6) applying a second mapping from the occurrences located during step 5) to identify a set of computer viruses that are likely to be present in the data string.

30 Claims, 4 Drawing Sheets

EFFICIENT DETECTION OF COMPUTER VIRUSES AND OTHER DATA TRAITS

FIELD OF THE INVENTION

The invention relates to the detection of data traits, such as infection by particular computer viruses, which may be possessed by data strings. In particular, the invention relates to methods for detecting data traits while using a minimum of primary system memory.

BACKGROUND OF THE INVENTION

There are several well accepted methods for detecting computer viruses in memory, programs, documents or other potential hosts that might harbor them. One popular method, employed in most anti-virus products, is called "scanning".

A scanner searches potential hosts for a set of one or more (typically several thousand) specific patterns of code called "signatures" that are indicative of particular known viruses or virus families, or that are likely to be included in new viruses. A signature typically consists of a pattern to be matched, along with implicit or explicit auxiliary information about the nature of the match, and possibly transformations to be performed upon the input data prior to seeking a match to the pattern. The pattern could be a byte sequence to which an exact or inexact match is to be sought in the potential host. More generally, the pattern could be a regular expression. The auxiliary information might contain information about the number and/or location of allowable mismatched bytes. It might also restrict the match in various ways; for example the match might be restricted to input data representing computer programs in the .EXE format, and a further restriction might specify that matches only be declared if they occur in a region within one kilobyte on either side of the entry point. The auxiliary information may also specify transformations; for example, the input data might need to be transformed by XORing adjacent bytes together prior to scanning for the indicated byte sequence. (This permits patterns to be located in data that have been encrypted by XORing each byte with any one-byte key; a detailed description can be found in U.S. Pat. No. 5,442,699, entitled "Searching for patterns in encrypted data", issued to William C. Arnold et al. on Aug. 15, 1995.) Other examples of transformations that are in common usage today include running an emulator on the input program to encourage a polymorphic virus to (virtually) decrypt itself prior to scanning for patterns, and parsing a Microsoft Word document to unscramble the macro data prior to scanning for macro viruses.

Typically, a scanner operates by first loading signature data for one or more viruses into memory, and then examining a set of potential hosts for matches to one or more signatures. If any signature is found, further action may be taken to warn the user of the likely presence of a virus, and in some cases to eradicate the virus.

As the number of known computer viruses is rapidly growing beyond 10,000, the problem of storing signatures and associated information in memory is becoming increasingly acute. This is especially so for the DOS operating system, which normally allots just 640 kilobytes for all programs and data in system memory, including virus signatures, the anti-virus program code, and anti-viral Terminate and Stay Resident processes, as well as any other unrelated code and data that may have been loaded into the system memory.

One possible solution to the memory shortage in DOS-based systems is for the anti-virus program to use a DOS extender, which permits programs to use more than 640 kilobytes of memory if such "extended memory" is present on the computer. However, although many of today's PCs have extended memory, DOS extenders can slow down the operation of an anti-virus program significantly. In any case, even in operating systems other than DOS, it is still desirable to minimize memory usage, provided that this can be done without significantly degrading the speed of the scanner.

Detection of computer viruses is but one example of the general problem of determining whether a given data string possesses any of a given set of traits. A data string is a sequence of bytes that represent information in a computer, such as a program or document. For data strings that represent computer programs, one example of a trait is the property of being infected with the Jerusalem virus. The set of traits could pertain to all known viruses or some subset of them. A second example of a trait of computer programs is the property of having been compiled by a particular compiler. For data strings that represent text, examples of data traits include the property that the text is in a particular language, such as French, or that it contains information about a particular topic, such as "sports" or "performances of Handel oratorios".

A common method for detecting data traits in data strings is to search for a set of patterns that are indicative of those traits. For computer viruses, the patterns are typically computer virus signatures as described above. The compiler used to generate a given body of machine code is a trait that can also be identified using signatures. To identify languages or subject areas, a text can be scanned for sets of keywords, and the occurrence frequencies of those keywords or of approximate matches to them may then be used to infer which if any traits of are present. Quite generally, there is a mapping from the located occurrences of the patterns to a (possibly empty) set of inferred data traits. The mapping may or may not take into account the locations of the occurrences within the data string. The mapping may be one-to-one, one-to-many, or many-to-one. For example, in computer virus applications, the mapping is approximately one-to-one, but some signatures occur in several viruses, and sometimes several signatures are used to identify a single virus.

Regardless of the particulars of the application, it is often the case that efficient detection of data traits within a data string requires a simultaneous search for a large number of patterns within that data string. In such cases, the memory required to store the patterns and any auxiliary data can be significant. It is generally desirable for any detector of data traits to be as efficient in all aspects as possible, and it is especially important for the detector to use as little computer memory as possible.

SUMMARY OF THE INVENTION

In broad outline, the present invention provides an efficient method for detecting the likelihood of the presence of known data traits in a data string, as well as a program storage device (e.g. a diskette) readable by a computing machine, tangibly embodying a program of instructions executable by the machine to perform method steps of that method.

The present invention therefore provides a method of detecting the likelihood of the presence of any of a first set of known data traits in a data string, by use of a second set G of generic features and a third set S of signatures, wherein the generic features and the signatures are characteristic of the first set of data traits, said method comprising the steps of:

a) loading the set G into a memory of a computer, b) locating occurrences within the data string of each generic feature in the set G, c) applying a first mapping from the occurrences located during step b) to a subset S* of S, d) loading all signatures from the subset S* into a memory of the computer, e) locating occurrences within the data string of all signatures from the subset S*, and f) applying a second mapping from the occurrences located during step e) to identify a set of data traits that are likely to be present in the data string.

Where desired, the method may comprise the further step, in dependence upon whether any identified set of data traits is likely to be present in said data string, of signaling the identities of the data traits in said identified set.

According to another preferred embodiment, the method may comprise the further step, in dependence upon whether any signatures are loaded into memory pursuant to step (d), of freeing the signatures from memory after carrying out step (e).

In a preferred embodiment of the inventive method, each data trait is a computer virus identifiable by a signature s of the third set S.

In a preferred embodiment of the inventive method, the second set G of generic features requires a smaller memory size for storage than the third set S of signatures.

Preferably, the aforesaid first mapping comprises:

c1) retrieving, for each generic feature occurring at least once in the data string, an associated list of signatures of the set S from a first lookup table, c2) concatenating all of the retrieved associated signature lists to form a concatenated signature list, c3) tallying the number of occurrences of each signature within the concatenated signature list, and c4) forming the subset S* from all signatures s for which the tallied number of occurrences in the concatenated signature list is not less than a threshold for s computed from a value obtained from a second lookup table.

According to a preferred embodiment of the inventive method, the first lookup table is derived automatically from a collection of data strings, each data string possessing at least one of the data traits, comprising the steps of:

L1a) locating all occurrences of each generic feature of set G and each signature of set S within each data string in said collection, L1b) defining an associated feature list for each signature s, consisting of all generic features that occur in every member of a defined subset of the set of the data strings in which said signature s is present, L1c) defining, for each generic feature g, an associated signature list of all signatures that include g among their associated feature lists, and L1d) forming the first lookup table by storing each generic feature g with the associated signature list thereof.

Preferably, the second lookup table is derived automatically from a collection of data strings, each data string possessing at least one of the data traits, comprising the steps of:

L2a) locating all occurrences of each generic feature of set G and each signature of set S within each data string in the collection, L2b) for each signature s, i) defining an associated feature list for s, consisting of all generic features that occur in every member of a defined subset of the set of data strings in which the signature s is present, ii) tallying the number of distinct generic features within the associated feature list, and iii) computing a function of the tally for signature s, and L2c) forming the second lookup table by storing each signature s with the function of the tally thereof.

In one preferred form, the function of the tally is the tally itself. In another, it may be the greater of a first chosen constant or the tally minus a second chosen constant.

As noted earlier, the invention also broadly provides a program storage device (such as computer tape or diskette) readable by a computing machine, tangibly embodying a program of instructions executable by the machine to perform method steps of a method of detecting the likelihood of the presence of any of a first set of known data traits in a data string, by use of a second set G of generic features and a third set S of signatures, wherein the generic features and the signatures are characteristic of the first set of data traits, the aforesaid method comprising the steps of:

a) loading the set G into a memory of a computer, b) locating occurrences within the data string of each generic feature in the set G, c) applying a first mapping from the occurrences located during step b) to a subset S* of S, d) loading all signatures from the subset S* into a memory of the computer, e) locating occurrences within the data string of all signatures from the subset S*, and f) applying a second mapping from the occurrences located during step e) to identify a set of data traits that are likely to be present in the data string.

As will be readily understood, the invention also includes preferred embodiments of the inventive program storage device which involve all embodiments of the methods disclosed hereinabove and throughout this specification.

Restating in other words, the present invention determines which if any data traits from among a first set T of such traits are likely to be possessed by a given data string D. It is efficient in its use of memory, and furthermore in some cases it can provide a speed advantage over existing techniques.

The invention can be regarded as a data string classifier comprising two basic components. The first component is a "standard" classifier that searches for a set S (i.e. "third set") of patterns and associated auxiliary data (hereinbelow referred to as "signatures") within a given data string D, and if any such signatures are found, uses a mapping between the located occurrences (i.e. the identities of any signatures that occur, and possibly their locations in D) and the data traits to conclude the likely presence of one or more data traits within D. Typically, each signature is associated with just one or perhaps a few of the data traits in T, so the mapping between signatures and data traits is usually quite simple, perhaps even one-to-one. The second component is a "filter" classifier that is applied before the "standard" classifier. The filter classifier searches for occurrences of a different set (i.e. "second set") G of patterns and associated auxiliary data (hereinbelow referred to as "generic features") within the given data string D. Typically, the generic features employed by the "filter" tend to be associated with several of the data traits, and are both more compact in representation and fewer in number than those employed by the "standard" classifier. Thus the amount of memory consumed by the set G tends to be far less than that consumed by the set S. The subset of occurrences of generic features found within D, if it contains any members, is used to construct a subset of signatures S* that could possibly be present within D. Then, rather than using the entire set of signatures S, the "standard" classifier need only load S* into memory from a secondary storage medium (such as a hard disk, diskette, or CD-ROM). The standard classifier then functions in the normal way, using the presence of any signatures found within D to conclude the likely presence of associated data traits within D.

In practical situations, such as computer virus scanning, the combined memory requirements of the "filter" classifier plus the typically small subset S* of signatures loaded by the "standard" classifier is less than the memory requirements of the unaugmented "standard" classifier, which must use the full set S of signatures. In other words, the memory requirements for G, S*, and the extra code introduced by the filter are significantly less than the memory requirements for S. By reducing the memory requirements in this way, the speed of the classifier need not be degraded, and in fact in an implementation of this invention the memory reduction helped to improve the overall speed of the classifier.

The set of signatures S may be derived manually or automatically; U.S. Pat. No. 5,452,442 describes how they may be extracted automatically. The set of generic features G may be derived manually or automatically; automatic derivation may be accomplished by means described in United States patent application Ser. No. 08/242,757, filed May 13, 1994, entitled "Adaptive Regression and Classification of Computational Bit Strings", in the names of G. J. Tesauro, G. B. Sorkin, and J. O. Kephart. The mapping between a subset of generic features and the associated subset of signatures that need to be checked may be derived manually, but in a preferred embodiment the mapping is derived automatically by procedures to be described more fully in the detailed description of the present invention.

In one embodiment of the present invention, the data string in question is any sequence of bytes representing executable instructions and associated data that may serve as a potential computer virus host, and the classifier is used to detect the likely presence of any virus from among a specified set of computer viruses. The "standard" component of the classifier is a virus scanner, such as the one incorporated into IBM AntiVirus, or virtually any other standard virus scanner.

A second embodiment of the present invention is its application to the problem of determining which, if any, compiler was used to generate a given executable computer program. In this application, the data string presented to the classifier is the machine code of the given computer program. The method includes scanning the program for a set of generic features, each feature being represented by a sequence of bytes to be matched exactly or with some specified number of mismatches; mapping the subset of generic features to a subset of signatures, each signature consisting of a byte sequence to be matched exactly or with some specified number of mismatches; scanning the program for each signature in the subset; and, if any signatures are located within the program, concluding that the program was compiled using the compiler associated with that signature or signatures.

BRIEF DESCRIPTION OF THE DRAWINGS

The present invention may be understood more clearly from the following detailed description, which is solely for explanation and should not be taken to limit the invention to any specific form thereof, taken together with the accompanying drawings, wherein.

DETAILED DESCRIPTION

Figure 1:
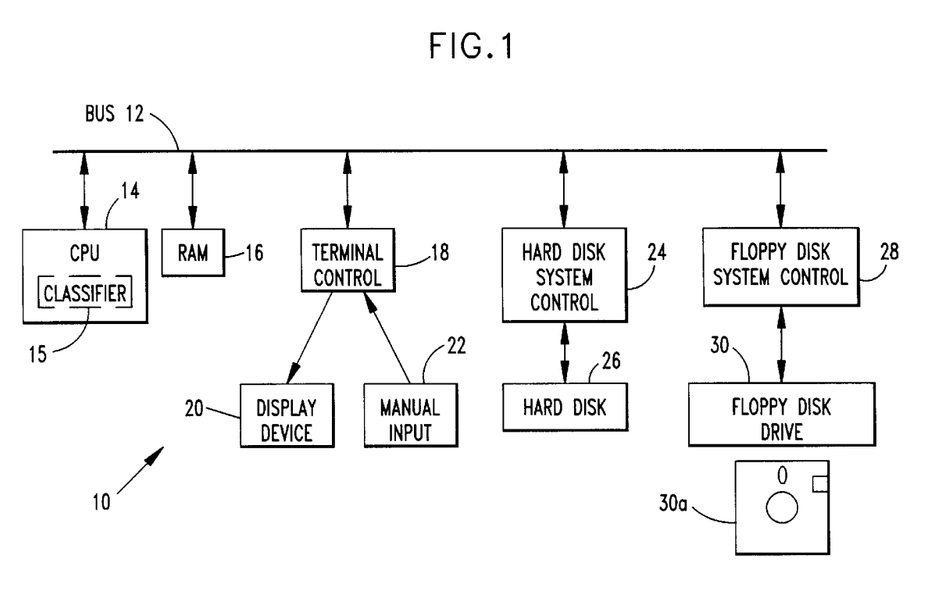
FIG. 1 is a block diagram of a computer system for carrying out the present invention.

FIG. 1 is a block diagram of a system 10 that is suitable for practicing the teaching of the invention.

A bus 12 is comprised of a plurality of signal lines for conveying addresses, data, and controls between a Central Processing Unit (CPU) 14 and a number of other system bus units. A RAM 16 is coupled to the system bus 12 and provides program instruction storage and working memory for CPU 14. A terminal control subsystem 18 is coupled to the system bus 12 and provides outputs to a display device 20, typically a CRT monitor, and receives inputs from a manual input device 22, such as a keyboard or pointing device (e.g. a mouse). A hard disk control subsystem 24 bidirectionally couples a rotating fixed disk, or hard disk 26, to the system bus 12. The control 24 and hard disk 26 provide mass storage for CPU instructions and data. A floppy disk control subsystem 28 which, along with floppy disk drives 30 is useful as an input means in the transfer of computer files from floppy diskette 30a to system memory, bidirectionally couples one or more floppy disk drives 30 to the system bus 12.

As will be understood, the components illustrated in FIG. 1 may be embodied within a personal computer, a portable computer, a workstation, a minicomputer, a supercomputer, or any other system that includes a computer. Accordingly, the details of the physical hardware embodiment of data processing system 10, such as the structure of bus 12 or the number of CPU's 14 that are coupled to the bus, are not crucial to the operation of the invention, and are therefore not described in further detail hereinbelow.

Figure 2:
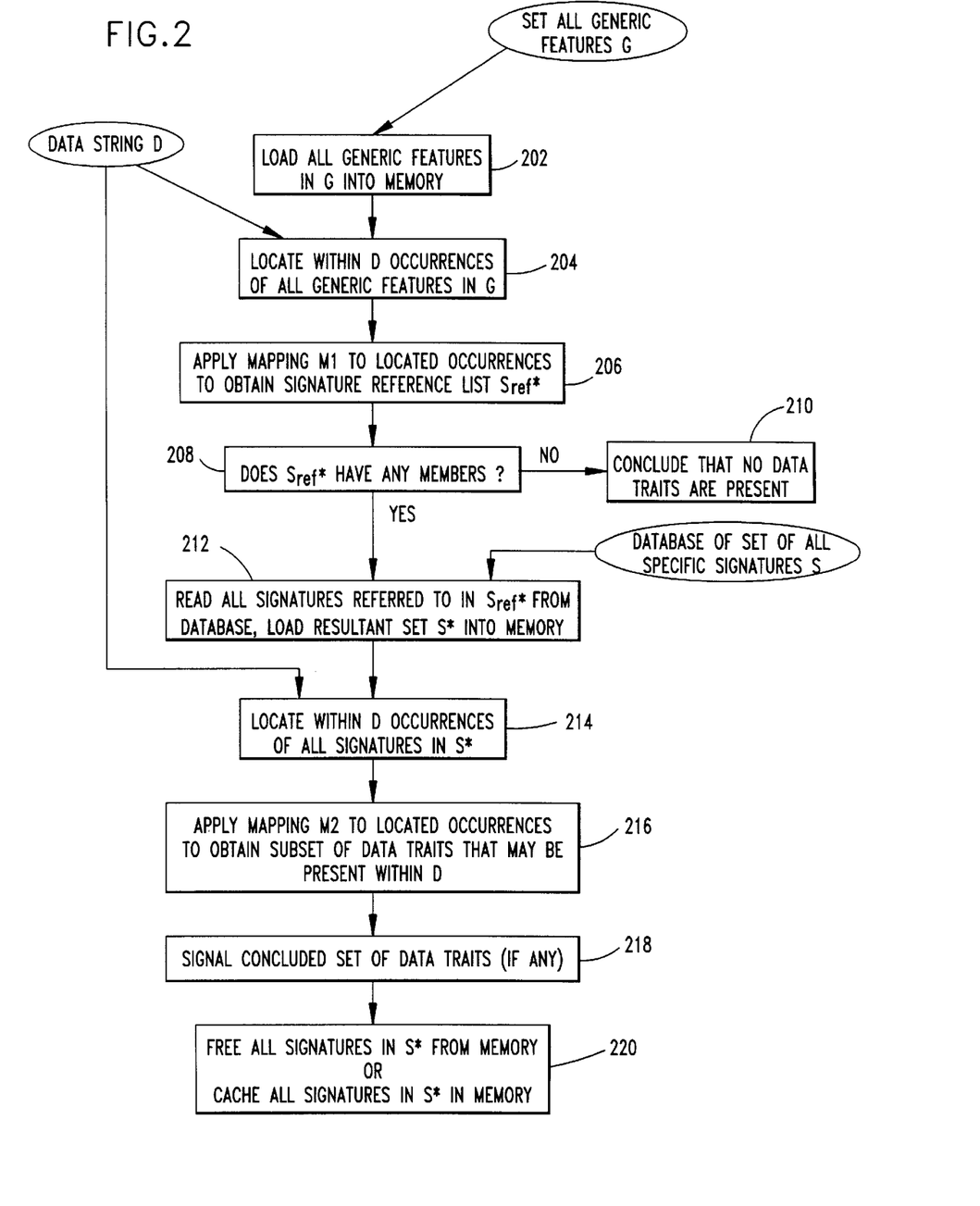
FIG. 2 is a flow diagram describing a method for detecting data traits in a given data string in accordance with the present invention.

The process according to the invention will now be described by way of a specific example shown in FIG. 2. FIG. 2 shows a flow diagram of the logic of the processes by which the likelihood of the presence of any data traits of interest within a given data string D, along with the identities of such data traits, is concluded.

First, at 202, the full second set G of generic features is loaded into a memory of a computer. The generic feature data specify patterns to be matched plus any associated auxiliary data as described earlier herein under the background of the invention. Then, at 204, the data string D is searched to find occurrences of each generic feature belonging to the set G. The data on located occurrences may include exact details on where each feature occurs in D, or it may merely count the number of occurrences of each pattern within D or within particular regions of D (e.g., if D represents a potentially infected host program, within 1000 bytes before or after the entry point), or it may merely note whether or not each generic feature occurred at all within D. Then, at 206, a first mapping function M1 maps the located occurrences in whatever form they are expressed into a signature reference list $S_{ref}^*$, comprising the identities of a subset S* of signatures selected from the full third set S of signatures. At 208, a determination is made as to whether the subset S* contains any signatures. If S* does not contain any signatures, it is concluded at 210 that no data traits of interest are likely to be present. Otherwise, if the subset S* contains any signatures, then at step 212 the signatures referred to in the signature reference list $S_{ref}^*$ are read from a database of the full set of signatures S residing on a secondary storage medium such as a hard disk, floppy diskette, or CD-ROM, and loaded into a primary storage medium, i.e. computer memory. Now the signature subset S* is present in memory. At 214, the data string D is searched to find occurrences of each signature in the subset S*. Again, the located occurrences may be as specific or unspecific about the exact location or number of instances of each pattern as is warranted by the application. Then, at 216, a second mapping function M2 maps the located occurrences into a concluded set of data traits that are likely to be present within D. The second mapping M2 is often quite simple; in the case of computer viruses it is typically implemented as look-up table that associates with each signature a list of one or more viruses that are likely to be present if that signature is found. Optionally, upon concluding that one or more data traits may be present within the data string, at 218 an appropriate signal may be generated, such as a message listing or describing any data traits that are likely to be present displayed on the computer display, or a trigger initiating other procedures appropriate given the data traits' presence. Optionally, at 220, the signature subset S* may be freed from memory, or it may be cached to potentially gain speed at the expense of some memory.

Typically, a signature is associated with just one or perhaps a few of the data traits in the set of interest, although this is not essential. The set of signatures may be derived by a variety of methods, including manual determination by a human expert, or automatic extraction of signatures from two sets of data strings: one set of data strings known to possess the data traits, and a second set of data strings known not to possess the data traits. Details of such an automatic signature extraction method are described in U.S. Pat. No. 5,452,442.

Typically, a generic feature is associated with several data traits in the set of interest, although this is not essential. The set of generic features may be derived manually by a human expert, or may be derived automatically from two sets of data strings: one set of data strings known to possess the data traits, and a second set of data strings known not to possess the data traits. Details of the automated extraction of generic features are described in U.S. patent application Ser. No. 08/242,757 to Tesauro et al.

The mapping function M1 that maps the located occurrences of the generic features in the data string into a signature reference list $S_{ref}^*$ may operate in a variety of ways. As previously stated, the mapping may or may not depend upon the exact locations or the number of times a given generic feature appears. When the data strings in question are potential computer virus hosts, it is possible to ignore details of the exact location (provided that the match falls within general regions permitted by the auxiliary data), and it is also possible to ignore details of the occurrence frequency (i.e. all that matters is whether or not a given feature ever appears). A flowchart of a preferred embodiment of the mapping function that has been implemented for the case in which the data strings are computer programs is provided in FIG. 3. For each generic feature g, if the number of times it occurs within the data regions defined by the auxiliary data for g is greater than zero, an associated signature list is obtained at 302 from a precomputed lookup table L1. At 304, all associated signature lists so retrieved are concatenated to form a concatenated signature list CSL.

Figure 3:
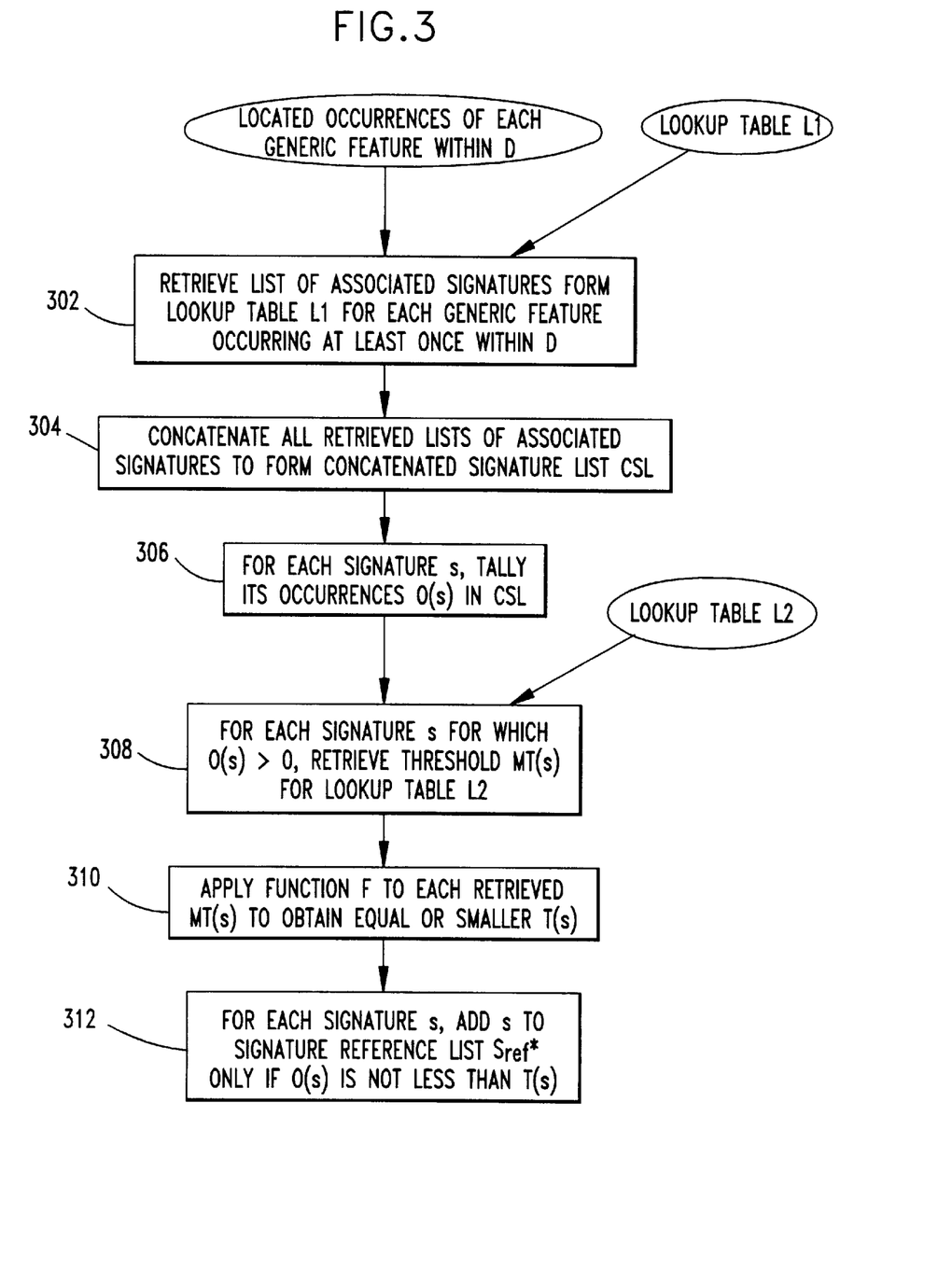
FIG. 3 is a flow diagram describing a mapping function that maps a set of generic features into a subset of signatures in accordance with the present invention.

At 306, the number of occurrences of each signature s within the concatenated signature list, O(s), is tallied. At 308, for each signature s for which O(s) exceeds zero, a maximum threshold value MT(s) is retrieved from a lookup table L2 that contains maximum thresholds for each signature in set S. At 310, a function F may be applied to each retrieved maximum threshold value MT(s) to obtain an equal or smaller threshold value T(s) representing the minimum number of times that s must appear within CSL in order to qualify for inclusion in the set S*. The rationale for reducing the threshold from MT(s) to a smaller value T(s) would be to accept some mismatches, for example in response to a user's expressed wish to do so. In such a case, the function F could for example compute T(s) as the greater of a first chosen constant (say one) or the MT(s) minus a second chosen constant. At 312, the signature s is added to the signature reference list $S_{ref}^*$ if and only if the tally O(s) is not less than the threshold value T(s).

The precomputed lookup table L1 containing, for each generic feature, a list of associated signatures, may be generated manually or automatically. In a preferred embodiment, it is generated automatically by the process depicted in the flowchart in FIG. 4. First, a collection of sample data strings, each of which is known to possess at least one of the data traits of interest, is searched at 402 to find all occurrences of each generic feature and each signature in each data string in the collection. (Inclusion of samples that do not possess any of the data traits will not cause the method to fail; it is merely wasteful.) Then, at 404, for each signature s, a subset of all data string samples containing s is identified. The subset of data samples could be all data samples in the collection that contain s, or it may be further restricted by other criteria; for example, in the computer virus embodiment, data samples containing "spurious" matches to signatures may be excluded from the subset.

A given signature s may be said to spuriously match a given member D of the collection of data strings if both of the following conditions are satisfied. First, the data trait or data traits possessed by D are known or can be inferred by an independent method that does not entail scanning for signatures in the set S and then applying the mapping M2 to infer the data traits. (For example, each member of a set of replicants obtained by intentionally causing a sample of a virus X to reproduce itself would be known to possess the data trait "infected with X".) Second, the set of data traits associated with s (those obtained by applying the mapping M2 to s), does not contain the data trait or data traits known independently to be possessed by D. (Even if the given member D is only infected with virus X, it could possibly contain other virus signatures, due to the fact that viruses often bear family resemblances to one another, and thus sometimes contain similar byte sequences.)

Figure 4:
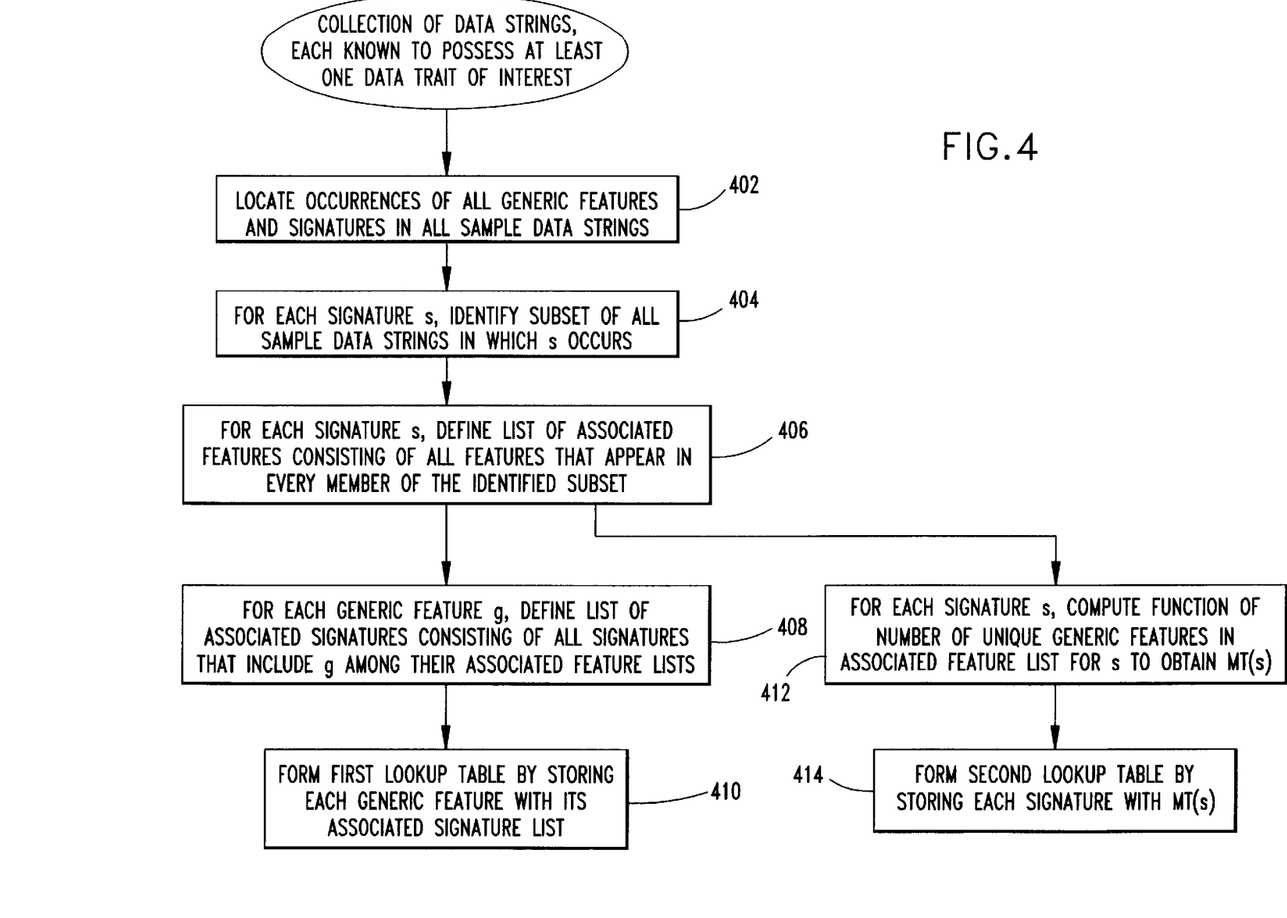
FIG. 4 is a flow diagram describing a method for deriving two lookup tables in accordance with the present invention.

Then, at 406, a list of associated features is defined for each signature s by including in that list all generic features that occur in every member of the data sample subset for s. Next, at 408, for each generic feature g a list of associated signatures is defined, consisting of all signatures that include g among their associated feature lists. Finally, at 410 the lookup table L1 is formed by storing each generic feature g with its associated signature list obtained at step 408.

The threshold lookup table L2 (containing the minimum number of times a given signature must appear in the concatenated signature list in order for it to be added to the signature reference list $S_{ref}^*$) may likewise be generated manually or automatically. A preferred embodiment is depicted in FIG. 4. Once the list of associated features for each signature s has been generated at step 406, a function F2 of the number of distinct generic features in each associated feature list is computed at step 412 to obtain the maximum threshold MT(s). Typically, the function F2 will be the identity, i.e. the function of the number will be the number itself. More generally, F2 will be less than or equal to the number itself; in the latter case this permits mismatches. Note that such an allowance for mismatches can be made either in the derivation of the threshold lookup table L2 or in the derivation of a threshold from the value in the lookup table at step 308. In other words, the functions F1 and F2 have essentially the same purpose—allowing for mismatches—and in any particular realizatio of the invention both, either, or neither may be applied. Finally, at step 414, the second lookup table is formed by storing each signature s with the maximum threshold MT(s).

The classifier data, including the full set of generic features G, the full set of signatures S, the precomputed lookup table L1 and the threshold lookup table L2 can be computed on a completely different computer system from the one in which the detection of data traits is performed, an arbitrary amount of time prior to the detection phase. The classifier data can be stored as one or more files, from which an unlimited number of copies can be created and stored on computers on which one desires to detect the presence of the data traits of interest. Later, when a data string is to be classified on one such computer, the classifier data can be loaded from the file or files into the memory of the computer, along with procedures for using the classifier data to classify data strings.

EXAMPLE

For abetter understanding of the invention, a specific example of use of the invention for virus detection will be described in two phases: a phase of "training", or derivation of the lookup and threshold tables, and a detection phase.

Training Phase

1. Inputs: In deriving a lookup table, the following three inputs will be used in this example:

A) A collection of virus-infected data string samples. Here it is supposed that there are 17 such samples, the first and last of which are shown:

B) A set G of generic features, derived from the collection of virus-infected samples of data strings in a) by means described in U.S. patent application Ser. No. 08/242, 757 by Tesauro et al. (In current practice, the number of generic features typically ranges from a few dozen to a few thousand in number.) Here it is supposed that there are four such generic features, g1, g2, g3, and g4, each of which is to be interpreted as a sequence of bytes that must be matched exactly, and may be found anywhere within the given data string:

g1: B74D01 g2: CD2180 g3: C3E807 g4: 175858

C) A set S of signatures, derived from the collection of virus-infected strings in accordance with methods disclosed in U.S. Pat. No. 5,452,442, issued on Sep. 19, 1995 to Jeffrey O. Kephart. Here it is supposed that there are 8 such signatures, s1,s2, . . . ,s8, each of which is to be interpreted as a sequence of bytes that must be matched exactly, and may be found anywhere within the given data string:

s1: 4D01BC820631343 s2: 4D01BC850631343 s3: FA8BCDE800005B8 s4: 8ED0BC000750B8C s5: 4F0026A0FE032EA s6: 2BCB2E8A0732C2D s7: 28B1E3C00E827FF s8: 6803A32400A16A0

2. Scan each sample for signatures and generic features. The next step in deriving the lookup table is to scan each virus-infected sample to locate occurrences of all signatures and all generic features, with the following results for samples V1 and V17:

```
                          | g1 |                            | g4 |       | g2 |
Sample V1:   CD13AB00B74D01BC8206313430049140009A9B175858BCAF37CD2180E9004A
                          |   s1   |

| g2 |                                    | g4 |
Sample V17:  906453C7CD2180D1C56803A32400A16A0A42CC9B511175858B2CF44A2E8E0
                          |   s8   |
```

Sample V1:
    CD13AB00B74D01BC8206313430049140009A9B175858-
    BCAF37CD2180E9004A

. . .
. . .
. . .

Sample V17:
    906453C7CD2180D1C56803A32400A16A0A42CC9-
    B511175858B2CF44A2E8E0

The results of the scans of V1, V2, . . . , V17 are recorded in Table A:

TABLE A

| Sample | Signatures | Generic Features | | |
|--------|------------|------|------|------|
| V1 | s1    | g1 | g2 |    | g4 |
| V2 | s1 s5 | g1 | g2 |    | g4 |
| V3 | s2    |    | g2 | g3 |    |

TABLE A-continued

| Sample | Signatures | | Generic Features | | |
|---|---|---|---|---|---|
| V4 | s2 | | g2 | g3 | |
| V5 | s3 | g1 | g2 | g3 | g4 |
| V6 | s3 | g1 | | g3 | g4 |
| V7 | s4 | g1 | g2 | | |
| V8 | s4 s7 | | g1 | g2 | g3 |
| V9 | s4 | | g2 | g3 | |
| Y10 | s5 | | g1 | g2 | |
| V11 | s6 | | g2 | g3 | g4 |
| V12 | s6 | | g2 | g3 | g4 |
| V13 | s7 | g1 | | | g4 |
| V14 | s8 | | g2 | g3 | g4 |
| V15 | s8 | g1 | g2 | | g4 |
| V16 | s1 | g1 | | | g4 |
| V17 | s8 | | g2 | | g4 |

3. Generate table of generic features associated with each signature. For each distinct signature, the next step is to identify all generic features ("associated feature list") that always co-occur with it in the latter Table A, in a second column of Table B. Next, one may tally (in a third column of Table B) the number of such distinct generic features found within the second column. Thresholds will be computed from this third column during the detection phase. Using Table A in this way, the following Table B can be derived:

TABLE B

| Signature | Associated Features List | # Assoc. Generic Features ("Tally") |
|---|---|---|
| s1 | g1 g4 | 2 |
| s2 | g2 g3 | 2 |
| s3 | g1 g3 g4 | 3 |
| s4 | g2 | 1 |
| s5 | g1 g2 | 2 |
| s6 | g2 g3 g4 | 3 |
| s7 | g1 | 1 |
| s8 | g2 g4 | 2 |

For example, in Table A it can be seen that s4 appeared in samples V7, V8, and V9. The only generic feature that appeared in every one of those samples was g2, so only g2 is associated with s4 in Table B.

The lookup table L2 can now be derived by applying a function F2 to the number of associated features for each signature. For simplicity, we will take F2 to be the identity. Then the lookup table L2 is simpley taken verbatim from the first and third columns of Table B:

TABLE L2

| | Lookup | |
|---|---|---|
| Signature | | Maximum Threshold |
| s1 | | 2 |
| s2 | | 2 |
| s3 | | 3 |
| s4 | | 1 |

TABLE L2-continued

| | Lookup | |
|---|---|---|
| Signature | | Maximum Threshold |
| s5 | | 2 |
| s6 | | 3 |
| s7 | | 1 |
| s8 | | 2 |

4. Invert to obtain signatures associated with each generic feature: Finally, Table B is inverted to obtain a lookup Table L1 listing, for each generic feature, all signatures with which it is associated in Table B. For example, in the second column of Table B, g3 is listed as an associated generic feature for signatures s2, s3, and s6, and this is recorded in Table L1.

TABLE L1

| | Lookup | |
|---|---|---|
| Generic Feature | | Associated Signature List |
| g1 | | s1 s3 s5 s7 |
| g2 | | s2 s4 s5 s6 s8 |
| g3 | | s2 s3 s6 |
| g4 | | s1 s3 s6 s8 |

Now all of the ingredients needed for detecting viruses in accordance with the invention are available: the sets G and S, the lookup table L1, and the lookup table L2.

DETECTION PHASE

This phase of the Example will exemplify how the present invention may be used to determine whether any of the 8 virus signatures are present in a data string D being studied. Instead of loading set S consisting of s1–s8 into memory, it is only necessary to load set G consisting of g1–g4, which consume much less storage. Then, standard scanning techniques are used to look for g1, g2, g3, and g4 within data string D

```
                    | g1 |        | g1 |            | g4 |
Data String D: CD13AB00B74D01BC8206B74D01313439A9B175858BC28B1E3C00E827FF01AA
```

Now the mapping M1 must be applied to obtain the signature reference list $S_{ref}^*$. In this example, two instances of G1 and one of G4 are found. In this example, the mapping M1 is of such a nature that the exact locations of the occurrences of G1 and G4 are inconsequential, as is the fact that G1 appeared more than once. Then, since G1 and G4 are the only generic features that appear in D, they are both used as lookup keys in Lookup Table L1, and their associated signature lists are concatenated to produce a concatenated signature list:

Concatenated signature list: s1 s3 s5 s7 s1 s3 s6 s8

Occurrences of each signature in the concatenated signature list are tallied, and displayed in the second column of Table D. Then, the maximum thresholds MT(s) for each signature s are retrieved from Lookup Table L2, and a function F1 is applied to each to obtain T(s). In this example, we take the function F1 to be the identity, so the thresholds in the third column of Table D are taken verbatim from the second column of Lookup Table L2. Then, columns two and three of Table D are compared, and those for which the tally in the second column meets or exceeds the threshold in the third column are indicated in the fourth column.

TABLE D

| Signature | # Occurrences | Threshold | Threshold Met or Exceeded? |
|---|---|---|---|
| s1 | 2 | 2 | Yes |
| s2 | 0 | 2 | |
| s3 | 2 | 3 | |
| s4 | 0 | 1 | |
| s5 | 1 | 2 | |
| s6 | 1 | 3 | |
| s7 | 1 | 1 | Yes |
| s8 | 1 | 2 | |

In this case, two signatures meet the criterion: s1 and s7, and the signature reference list Sref* consists of s1 and s7.

Accordingly, only set S*, consisting of signatures s1 and s7, is loaded from disk into memory, and standard scanning methods (e.g. those employed by IBM AntiVirus) may then be used to try to locate s1 and s7 within the data string D. The result of this scan is:

Data String D:  CD13AB00B74D01BC8206B74D01313439A9B175858BC28B1E3C00E827FF01AA
                                                    |      s7      |

The presence of s7 within data string D is therefore detected, and a mapping M2 can be applied to obtain a list of viruses associated with s7 (typically just one). The appropriate action can be taken, e.g. warning users of the likely presence of the virus. Alternatively, an appropriate signal can be sent to other processes beyond the scope of this invention that may need to be informed about the presence of the data trait.

At this point, s1 and s7 may be removed from memory if desired, although it may be preferred to keep them if caching is used.

As may now be readily appreciated, the exemplified invention required only a memory size needed to store g1, g2, g3, g4, s1 and s7 for scanning purposes, rather than a much larger memory size for storing all 8 possible virus signatures s1, s2 . . . , s8 of this example.

Although the invention has been explained with reference to a preferred application involving computer viruses, other applications of the inventive concepts disclosed herein will be apparent to those skilled in the art. Accordingly, it is intended that all applications of the invention be encompassed by the claims that follow.

What is claimed is:

1. A method of detecting the likelihood of the presence of any of a first set of known data traits in a data string, by use of a second set G of generic features and a third set S of signatures, wherein the generic features and the signatures are characteristic of said first set of data traits, said method comprising the steps of:

a) loading the set G into a memory of a computer, b) locating occurrences within the data string of each generic feature in said set G, c) applying a first mapping from the occurrences located during step b) to obtain a subset S* of S, d) loading all signatures from the subset S* into a memory of said computer, e) locating occurrences within said data string of all signatures from the subset S*, and f) applying a second mapping from the occurrences located during step e) to identify a set of data traits that are likely to be present in the data string.

2. A method as set forth in claim 1, in which said first mapping comprises:

c1) retrieving, for each generic feature occurring at least once in the data string, an associated list of signatures of said set S from a first lookup table, c2) concatenating all of the retrieved associated signature lists to form a concatenated signature list, c3) tallying the number of occurrences of each signature within the concatenated signature list, and c4) forming said subset S* from all signatures s for which the tallied number of occurrences in the concatenated signature list is not less than a threshold for s computed from a value obtained from a second lookup table.

3. A method as set forth in claim 2, in which the first lookup table is derived automatically from a collection of data strings, each data string possessing at least one of the data traits, comprising the steps of:

L1a) locating all occurrences of each generic feature of set G and each signature of set S within each data string in said collection, L1b) defining an associated feature list for each signature s, consisting of all generic features that occur in every member of a defined subset of the set of said data strings in which said signature s is present, L1c) defining, for each generic feature g, an associated signature list of all signatures that include g among their associated feature lists, and L1d) forming said first lookup table by storing each generic feature g with the associated signature list thereof.

4. A method as set forth in claim 3, wherein the defined subset of the set of said data strings in which said signature s is present is the set of said data strings itself.

5. A method as set forth in claim 3, wherein the defined subset of the set of said data strings in which said signature s is present is derived from said set of data strings and a set of at most one supplied set of associated data traits for each data string, comprising the steps of:

a) including each data string in said set of data strings in said subset of data strings, and b) for each data string in said set for which a set of associated data traits has been supplied, eliminating that data string from said subset if its supplied set of associated data traits and the data traits associated with s by said second mapping contain no common data traits.

6. A method as set forth in claim 2, in which the second lookup table is derived automatically from a collection of data strings, each data string possessing at least one of the data traits, comprising the steps of:

L2a) locating all occurrences of each generic feature of set G and each signature of set S within each data string in the collection, L2b) for each signature s, i) defining an associated feature list for each signature s, consisting of all generic features that occur in every member of a defined subset of the set of said data strings in which said signature s is present, ii) tallying the number of distinct generic features within said associated feature list, and iii) computing a function of said tally for said signature s, and L2c) forming said second lookup table by storing each signature s with the function of said tally thereof.

7. A method as set forth in claim 6, in which the function of the tally is the tally itself.

8. A method as set forth in claim 6, in which the function of the tally is the greater of a first chosen constant or the tally minus a second chosen constant.

9. A method as set forth in claim 1, comprising the further step, in dependence upon whether any identified set of data traits is likely to be present in said data string, of signaling the identity of the data traits of said identified set.

10. A method as set forth in claim 1, comprising the further step, in dependence upon whether any signatures are loaded in to memory pursuant to step (d), of freeing said signatures from memory after carrying out step (e).

11. A method as set forth in claim 1, comprising the further step, in dependence upon whether any signatures are loaded in to memory, of caching said signatures in memory.

12. A method as set forth in claim 1, 2, 3, or 6, wherein the data traits are computer viruses.

13. A method as set forth in claim 1, 2, 3, or 6, wherein each data trait is a property of having been compiled by a specific compiler.

14. A method as set forth in claim 1, 2, 3, or 6, wherein each data trait is a computer virus identifiable by at least one signature of said third set S.

15. A method as set forth in claim 1, 2, 3, or 6, wherein each data trait is a computer virus identifiable by at least one signature of said third set S, said second set G of generic features requiring a smaller memory size for storage than said third set S of signatures.

16. A program storage device readable by a computing machine, tangibly embodying a program of instructions executable by the machine to perform method steps of a method of detecting the likelihood of the presence of any of a first set of known data traits in a data string, by use of a second set G of generic features and a third set S of signatures, wherein the generic features and the signatures are characteristic of said first set of data traits, said method comprising the steps of:

a) loading the set G into a memory of a computer, b) locating occurrences within the data string of each generic feature in said set G, c) applying a first mapping from the occurrences located during step b) to a subset S* of S, d) loading all signatures from the subset S* into a memory of said computer, e) locating all occurrences within said data string of all signatures from the subset S*, and f) applying a second mapping from the occurrences located during step e) to identify a set of data traits that are likely to be present in the data string.

17. A program storage device as set forth in claim 16, in which said first mapping comprises:

c1) retrieving, for each generic feature occurring at least once in the data string, an associated list of signatures of said set S from a first lookup table, c2) concatenating all of the retrieved associated signature lists to form a concatenated signature list, c3) tallying the number of occurrences of each signature present within the concatenated signature list, and c4) forming said subset S* from all signatures s for which the tallied number of occurrences in the concatenated signature list is not less than a threshold for s computed from a value obtained from a second lookup table.

18. A program storage device as set forth in claim 17, in which the first lookup table is derived automatically from a collection of data strings, each data string possessing at least one of the data traits, comprising the steps of:

L1a) locating all occurrences of each generic feature of set G and each signature of set S within each data string in said collection, L1 b) defining an associated feature list for each signature s, consisting of all generic features that occur in every member of a defined subset of the set of said data strings in which said signature s is present, L1c) defining, for each generic feature g, an associated signature list of all signatures that include g among their associated feature lists, and L1d) forming said first lookup table by storing each generic feature g with the associated signature list thereof.

19. A method as set forth in claim 18, wherein the defined subset of the set of said data strings in which said signature s is present is the set of said data strings itself.

20. A method as set forth in claim 18, wherein the defined subset of the set of said data strings in which said signature s is present is derived from said set of data strings and a set of at most one supplied set of associated data traits for each data string, comprising the steps of:

a) including each data string in said set of data strings in said subset of data strings, and b) for each data string in said set for which a set of associated data traits has been supplied, eliminating that data string from said subset if its supplied set of associated data traits and the data traits associated with s by said second mapping contain no common data traits.

21. A program storage device as set forth in claim 17, in which the second lookup table is derived automatically from a collection of data strings, each data string possessing at least one of the data traits, comprising the steps of:

L2a) locating all occurrences of each generic feature of set G and each signature of set S within each data string in the collection, L2b) for each signature s, i) defining an associated feature list for each signature s, consisting of all generic features that occur in every member of a defined subset of the set of said data strings in which said signature s is present, ii) tallying the number of distinct generic features within said associated feature list, and iii) computing a function of said tally for said signature s, and L2c) forming said second lookup table by storing each signature s with the function of said tally thereof.

22. A program storage device as set forth in claim 19, in which the function of the tally is the tally itself.

23. A program storage device as set forth in claim 19, in which the function of the tally is the greater of a first chosen constant or the tally minus a second chosen constant.

24. A program storage device as set forth in claim 16, comprising the further step, in dependence upon whether any identified set of data traits is likely to be present in said data string, of signaling the identity of the data traits of said identified set.

25. A program storage device as set forth in claim 16, comprising the further step, in dependence upon whether any signatures are loaded in to memory pursuant to step (d), of freeing said signatures from memory after carrying out step (e).

26. A program storage device as set forth in claim 16, comprising the further step, in dependence upon whether any signatures are loaded in to memory, of caching said signatures in memory.

27. A program storage device as set forth in claim 16, 17, 18, or 19, wherein the data traits are computer viruses.

28. A program storage device as set forth in claim 16, 17, 18, or 19, wherein each data trait is a property of having been compiled by a specific compiler.

29. A program storage device as set forth in claim 16, 17, 18, or 19, wherein each data trait is a computer virus identifiable by at least one signature of said third set S.

30. A program storage device as set forth in claim 16, 17, 18, or 19, wherein each data trait is a computer virus identifiable by at least one signature of said third set S, said second set G of generic features requiring a smaller memory size for storage than said third set S of signatures.

\* \* \* \* \*